(No Model.)
T. J. INGRAHAM.
FENCING STRAND.
No. 453,116. Patented May 26, 1891.
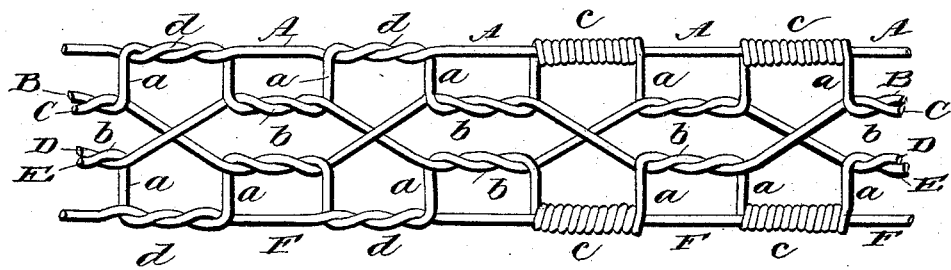
Witnesses
L. C. Hills.
E. H. Bond
Inventor:
Thos. J. Ingraham
E. B. Stocking
Attorney

UNITED STATES PATENT OFFICE.

THOMAS J. INGRAHAM, OF HORNELLSVILLE, NEW YORK.

FENCING-STRAND.

SPECIFICATION forming part of Letters Patent No. 453,116, dated May 26, 1891.

Application filed December 31, 1890. Serial No. 376,345. (No model.)

*To all whom it may concern:*

Be it known that I, THOMAS J. INGRAHAM, a citizen of the United States, residing at Hornellsville, in the county of Steuben, State of New York, have invented certain new and useful Improvements in Fencing-Strands, of which the following is a specification, reference being had therein to the accompanying drawing.

This invention relates to certain new and useful improvements in wire fencing; and it has for its objects, among others, to provide an improved, cheap, simple, and ornamental fencing-strand that can be readily manufactured by simple machinery and which in use shall be durable.

Other objects and advantages of the invention will hereinafter appear, and the novel features thereof will be specifically defined by the appended claim.

The invention is clearly illustrated in the accompanying drawing, which, with the letters of reference marked thereon, forms a part of this specification, and in which is shown a face view of a portion of a fencing-strand constructed in accordance with my invention.

In carrying out my invention I wish to here state that the strand, as hereinafter described and as shown in the drawing, may be manufactured in any manner found to be practicable, and I wish it distinctly understood that the following claim is to be construed as covering the article irrespective of its method of manufacture.

In the strand shown there are six wires or strands, and for convenience in describing the article I have chosen to designate the said wires by the letters A, B, C, D, E, and F. The wires A and F are practically parallel wires and are arranged at a distance corresponding to the width of the required strand. The wires B and E are then twisted around the said wires A and F, the wire B around the wire A and the wire E around the wire F. The wires B and E, after being twisted around the outer wires, are turned inward at right angles to the said outer wires, as shown at *a*, and then extend parallel, or substantially so, with the said outer wires, as shown at *b*, and are there twisted with the wires C and D, which are arranged substantially centrally of the completed strand, and are crossed between the places where they are twisted with the wires B and E. The number of twists of the wires B and E around the wires A and F, as well as the number of twists of the wires C and D and B and E, may be varied without departing from the spirit of the invention or sacrificing any of its advantages. The twist of the wires A and B and E and F may, instead of being as shown at *c*, be as shown at *d*, where the wires are twisted together instead of one being coiled around the other.

What I claim as new is—

The fencing-strand composed of the outer substantially parallel wires, the wires B and E, twisted at intervals around the outer wires and between the twists extended inward at points opposite each other, and the central wires alternately twisted with the wires B and E between the inwardly-extending portions and crossed between the said twists, substantially as shown and described.

In testimony whereof I affix my signature in presence of two witnesses.

THOMAS J. INGRAHAM.

Witnesses:
L. H. CLARK,
WELLINGTON SALT.